(12) United States Patent
Okuno et al.

(10) Patent No.: US 8,982,519 B2
(45) Date of Patent: Mar. 17, 2015

(54) CURRENT DIFFERENTIAL RELAY AND CURRENT DIFFERENTIAL RELAY SYSTEM USING CURRENT DIFFERENTIAL RELAY THEREOF

(71) Applicant: Kabushiki Kaisha Toshiba, Tokyo (JP)

(72) Inventors: Koichi Okuno, Tokyo (JP); Masamichi Saga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 14/019,176

(22) Filed: Sep. 5, 2013

(65) Prior Publication Data

US 2014/0168841 A1 Jun. 19, 2014

(30) Foreign Application Priority Data

Sep. 6, 2012 (JP) .................................. 2012-196393

(51) Int. Cl.
*H02H 3/00* (2006.01)
*H01H 53/01* (2006.01)
*H02H 7/26* (2006.01)
*H02H 1/00* (2006.01)

(52) U.S. Cl.
CPC ............... *H01H 53/01* (2013.01); *H02H 7/263* (2013.01); *H02H 1/0084* (2013.01)
USPC ............................................. 361/62; 361/64

(58) Field of Classification Search
USPC ..................................................... 361/62–69
See application file for complete search history.

(56) References Cited

U.S. PATENT DOCUMENTS

2008/0068769 A1* 3/2008 Ortega ........................... 361/62
2008/0309505 A1 12/2008 Sorimachi et al.
2011/0310518 A1* 12/2011 Komatsu et al. ................ 361/64

FOREIGN PATENT DOCUMENTS

JP 2009-284758 3/2009

OTHER PUBLICATIONS

Extended European Search Report issued in related European Patent Application No. 13182961.6 mailed Feb. 5, 2014, 7 pages.

* cited by examiner

*Primary Examiner* — Danny Nguyen
(74) *Attorney, Agent, or Firm* — Baker Botts L.L.P.

(57) ABSTRACT

A current differential relay comprises: an interface section; a quantization section; a communication section; and a difference calculation section. The quantization section quantizes current received by the interface section and converts it to first current data. The communication section, in the case where this relay is a representative current differential relay of a first group, transmits second current data from another current differential relay belonging to the first group and the first current data jointly to a representative current differential relay belonging to the second group, receives third current data from the representative current differential relay, and transmits the third current data to the other current differential relays. A difference calculation section executes a current difference calculation based on the first to third current data.

10 Claims, 8 Drawing Sheets

CURRENT DIFFERENTIAL RELAY AND CURRENT DIFFERENTIAL RELAY SYSTEM USING CURRENT DIFFERENTIAL RELAY THEREOF

CROSS REFERENCE TO RELATED APPLICATION

This application claims benefit of priority from Japanese Application No. JP2012-196393 filed Sep. 6, 2012; the entire contents of which are incorporated by reference herein.

FIELD

Embodiments described herein relate generally to a current differential relay system for protecting a transmission line connected with a substation by a plurality of current differential relays, and to a current differential relay employed in this system.

BACKGROUND

The following systems are available for transmitting current data between multi-terminal current differential relays used in a conventional current differential relay system. A first type of system provides one-to-one transmission whereby each current differential relay is provided with channels whereby it can exchange current data individually with all other current differential relays. Next is a multicast transmission system, in which a channel such as for example a LAN (local area network) is provided and each current differential relay transmits current data to all other current differential relays through the LAN (Local Area Network). Next, a bucket relay type transmission system may be provided, in which all of the current differential relays are connected by a single loop-form channel, the current differential relays receive current data transmitted in a predetermined direction through this channel, and the current data that is received is transmitted to the next current differential relay, being appended to the current data of the terminal that received the aforementioned current data. Also available is the representative terminal identification transmission system, in which current data is concentrated onto a representative current differential relay. The representative terminal identification transmission system is adopted in cases where it is impossible to employ any of the one-to-one transmission system, multicast transmission system or bucket relay type transmission system. In the representative terminal identification transmission system, if a fault is detected, the representative current differential relay transmits a breaker trip signal for clearing the fault to each current differential relay, using the channel that is employed for current data collection. Such a system is disclosed in Laid-open Japanese Patent Application Number 2009-284758 (hereinafter referred to as Patent Reference 1).

However, the aforementioned transmission systems have the following respective problems. Specifically, in the case of the one-to-one transmission system, a considerable amount of communication processing and communication volume are involved, so there is a limit to the number of current differential relays that may be provided in such a current differential relay system. In the case of a multicast transmission system, when the number of current differential relays provided in the current differential relay system becomes large, the reception processing at each current differential relay is increased. In the case of a bucket relay type transmission system, when the number of current differential relays provided in the current differential relay system becomes large, the cumulative transmission time lag becomes large. In the case of a representative terminal identification transmission system, when the number of current differential relays provided in the current differential relay system becomes large, reception processing at the representative current differential relay is increased.

According to an aspect of the present technology, an object of the present invention is to provide a current differential relay system wherein, even when a large number of current differential relays are provided in a current differential relay system, by exchanging current data between current differential relays, the reception processing of each current differential relay is reduced and the network load can be reduced, and a current differential relay employed in such a system.

In order to achieve the above object, the present embodiment is constructed as follows. Specifically, a current differential relay that is employed in a current differential relay system that is used to protect a transmission line connecting installations by a plurality of current differential relays comprises: an interface section; a quantization section; a communication section; and a difference calculating section. The interface section receives current supplied from the aforementioned transmission line. The quantization section quantizes this received current and converts it to first current data. In the case where the communication section is a representative current differential relay of a first group formed of some current differential relays of the aforementioned plurality of current differential relays, the communication section receives second current data from another current differential relay belonging to the aforementioned first group, transmits the aforementioned second current data and the aforementioned first current data jointly to a representative current differential relay belonging to the second group, receives third current data from the aforementioned representative current differential relay, and transmits the aforementioned third current data to the aforementioned other current differential relay. The difference calculation section executes current difference calculation using the aforementioned first to third current data.

DETAILED DESCRIPTION

Figure 1:
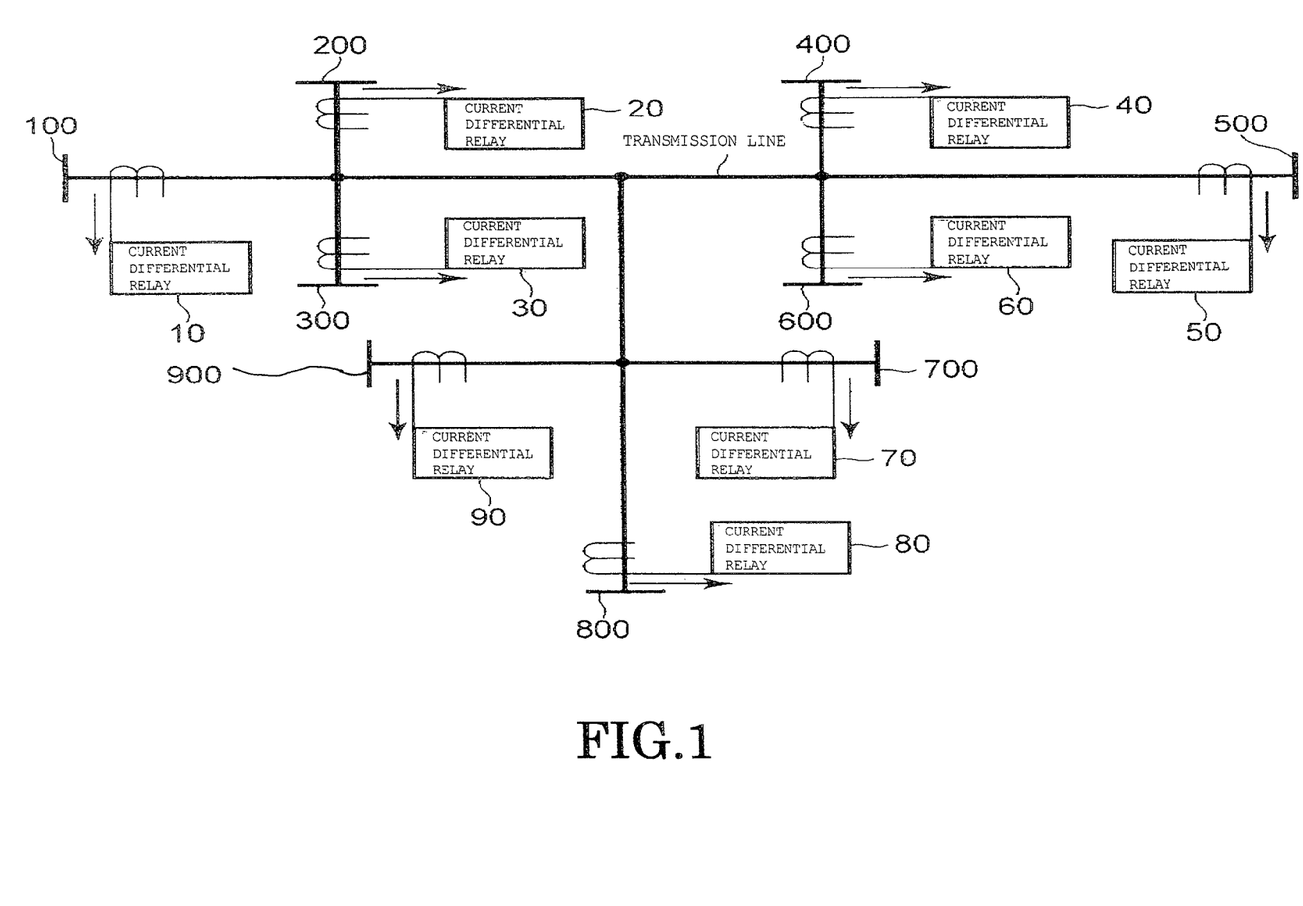
FIG. 1 is a view showing the layout of a current differential relay system according to the present embodiment.

An embodiment is described below with reference to the drawings. FIG. 1 is a view showing the layout of a current differential relay system according to the present embodiment. In the case of the current differential relay system shown in FIG. 1, respective current differential relays 10 to 90 are arranged at each substation, in order to protect a transmission line connecting nine substations 100 to 900. The current differential relays 10 to 90 are respectively connected by a communication network such as a gigabit Ethernet (Registered Trademark).

Figure 2:
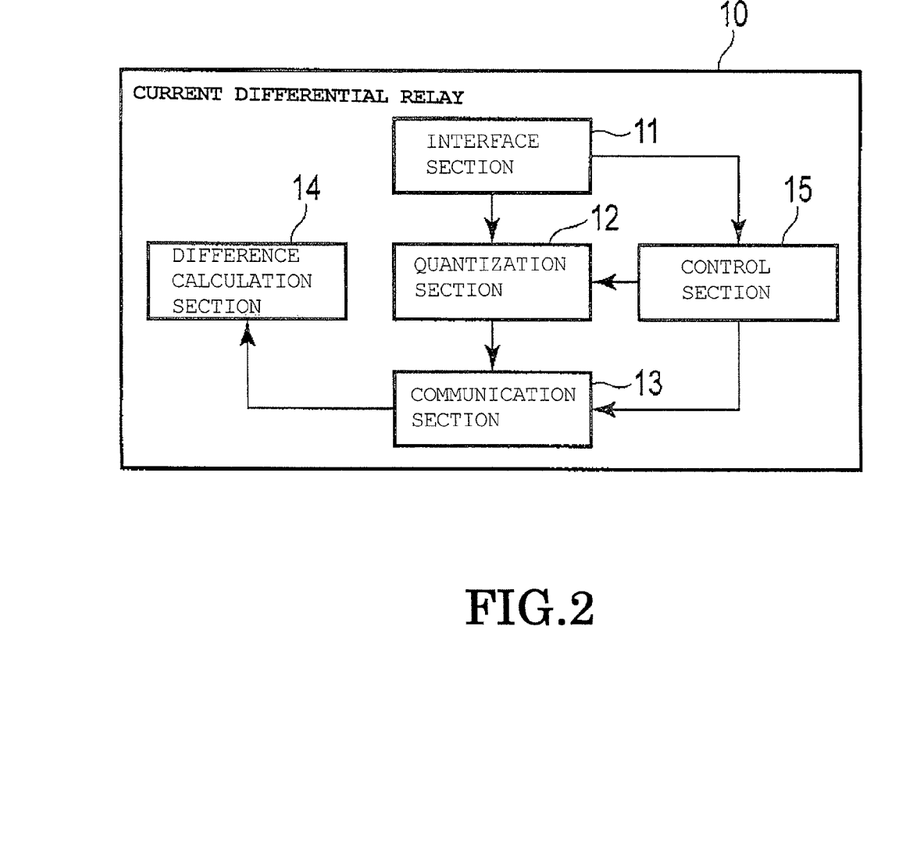
FIG. 2 is a block diagram showing the functional layout of the current differential relay shown in FIG. 1.

FIG. 2 is a block diagram showing the functional layout of the current differential relay shown in FIG. 1. The operation of the current differential relays 10 to 90 is respectively identical, so, in FIG. 2, the current differential relay 10 will be described as a typical example. The current differential relay 10 shown in FIG. 2 comprises an interface section 11, quantization section 12, communication section 13, difference calculation section 14 and control section 15.

The interface section 11 inputs the current flowing through the transmission line.

When the current is input by the interface section 11, the quantization section 12 creates current data by quantizing this current that has thus been input, in accordance with a synchronization signal that is supplied from the control section 15.

Under transmission control from the control section 15, the communication section 13 transmits the current data created by the quantization section 12 to a prescribed current differential relay. Also, the communication section 13 receives current data transmitted from other current differential relays.

When the current data is received by the communication section 13 from the other current differential relays, the difference calculation section 14 performs current difference calculation using its own current data and the current data from the other current differential relays.

The control section 15 comprises for example a CPU (central processing unit) and memory such as ROM (read only memory) and RAM (random access memory). The control section 15 controls operation within the current differential relay by executing a prescribed program by the CPU.

When its host device i.e. the relay in which the memory is installed is a representative current differential relay of a group that is constituted by some current differential relays of the totality of current differential relays, the memory of the control section 15 of this host device registers the fact that its host device is this representative current differential relay. Also registered in this memory are the current differential relays constituting this group and the representative current differential relays of other groups.

Also if its host device is not a representative current differential relay, the memory registers the current differential relays constituting the group and also the representative current differential relay thereof. It should be noted that the memory registers the positional information of the aforementioned representative current differential relay, irrespective of whether the host device of this memory is a representative current differential relay or not. The "positional information" indicates for example the IP address (Internet Protocol Address) or the like.

It should be noted that which of the current differential relays in the group is to be designated as the representative current differential relay may be set beforehand manually by the system administrator, or may be set automatically by the control section 15 in accordance with preset conditions.

The control section 15 outputs a synchronization signal to the quantization section 12 in order to synchronize the quantization timing in the quantization section 12. For example, the control section 15 may output, to the quantization section 12, a synchronization signal created based on a synchronization signal from an external reference signal (or an external standard signal) such as GPS (Global Positioning System).

The control section 15 performs transmission control of the communication section 13 in accordance with whether the host device is a representative current differential relay or not, and transmits the current data to the designated current differential relay in accordance with the positional information registered in the memory.

Specifically, if the host device is a representative current differential relay, the control section 15 combines the current data transmitted from the other current differential relays in the group with the current data created by the quantization section 12 and controls the communication section 13 so as to transmit this combined current data to the representative current differential relays of the other groups. Also, the control section 15 transmits the current data that was transmitted from the representative current differential relays of the other groups to the other current differential relays in its group.

If the host device is not a representative current differential relay, the control section 15 controls the communication section 13 so as to transmit the current data created by the quantization section 12 to the other current differential relays in its group.

Figure 3:
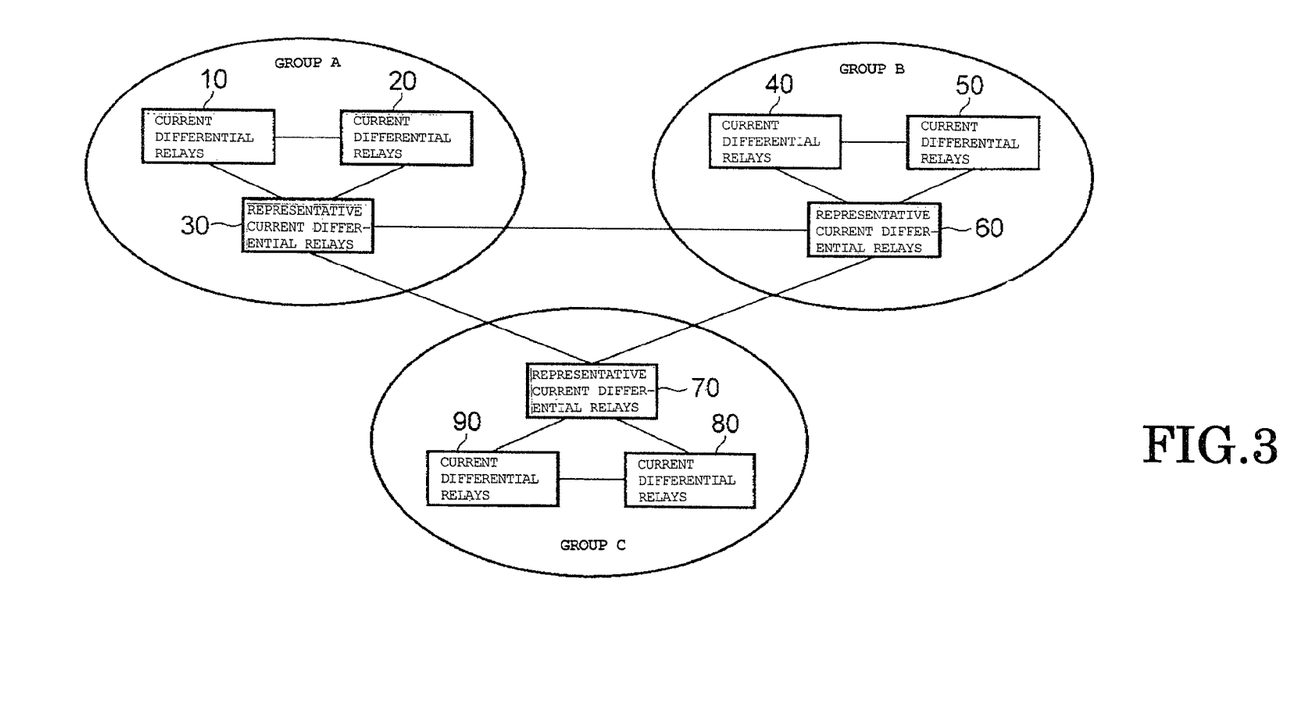
FIG. 3 is a view showing an example of groups constituted in the current differential relay system shown in FIG. 1.

Next, the operation of a current differential relay system constructed as above will be described. FIG. 3 is a view showing an example of groups constituted in the current differential relay system.

In FIG. 3, the current differential relays 10 to 30 form a group A and, of these, the current differential relay 30 is a representative current differential relay. That is, the current differential relay 30 is registered as a representative current differential relay in the memory of the control sections 15 of the current differential relays 10 and 20. Also, the fact that its host device is a representative current differential relay is registered in the memory of the control section 15 of the representative current differential relay 30 and the fact that the current differential relays 10 and 20 are current differential relays of the group A and the fact that the current differential relays 60, 70 are representative current differential relays of the groups B and C are registered.

The group B is formed by the current differential relays 40 to 60: of these, the current differential relay 60 is the representative current differential relay. That is to say, the current differential relay 60 is registered in the memory of the control section 15 of the current differential relays 40, 50 as the representative current differential relay. Also, the memory of the control section 15 of the representative current differential relay 60 registers that its host device is the representative current differential relay and registers the fact that the current differential relays 40, 50 are current differential relays of group B and the fact that the current differential relays 30, 70 are the representative current differential relays of the groups A and C.

Also, the group C is formed by the current differential relays 70 to 90 and, of these, the current differential relay 70 is the representative current differential relay. That is to say, the memory of the control section 15 of the current differential relays 80, 90 registers the current differential relay 70 as the representative current differential relay. Also, the memory of the control section 15 of the representative current differential relay 70 registers that its host device is the representative current differential relay and registers that the current differential relays 80, 90 constitute current differential relays of the group C and that the current differential relays 30, 60 constitute the representative current differential relays of the groups A and B.

In FIG. 3, for example the operation in group A is described.

The current differential relay 10 transmits the current data created by the quantization section 12 to the current differential relay 20 and the representative current differential relay 30. The current differential relay 20 transmits the current data created by the quantization section 12 to the current differential relay 10 and the representative current differential relay 30. The representative current differential relay 30 combines the current data transmitted from the current differential relays 10 and 20 with the current data created in its host device and transmits this combined current data to the representative current differential relay 60 of the group B and to the representative current differential relay 70 of the group C.

Also, the representative current differential relay 30 receives the current data transmitted from the representative current differential relay 60 of the group B and from the representative current differential relay 70 of the group C. At this point, the current data of the current differential relays 40 to 60 are combined in the current data from the representative current differential relay 60 and the current data from the current differential relays 70 to 90 are combined in the current data from the representative current differential relay 70. The difference calculation section 14 in the representative current differential relay 30 executes current difference calculation based on the current data of the current differential relays 10 to 90. The representative current differential relay 30 transmits the current data from the current differential relays 30 to 90 to its own current differential relays 10, 20.

The current differential relay 10 receives the current data of the current differential relays 30 to 90 that is transmitted thereto from the representative current differential relay 30 and the current data of the current differential relay 20 that is transmitted thereto from the current differential relay 20. The difference calculation section 14 of the current differential relay 10 executes current difference calculation based on the current data from the current differential relays 10 to 90. The current differential relay 20 receives the current data of the current differential relays 30 to 90 that is transmitted thereto from the representative current differential relay 30 and the power data of the current differential relay 10 that is transmitted thereto from the current differential relay 10. The difference calculation section 14 of the current differential relay 20 executes current difference calculation based on the current data from the current differential relays 10 to 90.

As described above, in this embodiment, the plurality of current differential relays are divided into a plurality of groups, and representative current differential relays are set up for each group. The representative current differential relays transmit the current data of the current differential relays of their own group to the other representative current differential relays. Also, the representative current differential relays receive the current data of the current differential relays of the other groups from the representative current differential relays of the other groups. The current differential relays in each group receive the current data from the other current differential relays of their own group and the current data from the representative current differential relay of their own group. In this way, in this current differential relay system, the number of communication targets in a single communication cycle is restricted and the number of times that communication is performed between the current differential relays can be reduced.

Consequently, with the current differential relay system of this embodiment, even if a large number of current differential relays are provided, the reception processing of each current differential relay is reduced and the network load is reduced, yet each current differential relay can acquire the current data of all the current differential relays. Consequently, with a current relay system according to this embodiment, implementation of a large-scale protective system becomes possible. Also, if a current differential relay system according to this embodiment is applied to the construction of a wide-area backup protection system in which current/voltage data is required of a large number of terminals over a wide range, a large-scale system can be constructed without requiring upgrading of the network.

The quantization section 12 is arranged to quantize the current in accordance with a synchronization signal that is supplied from the control section 15. In this way, all the current differential relays can carry out current difference calculation using current data relating to the same time point.

Figure 4:
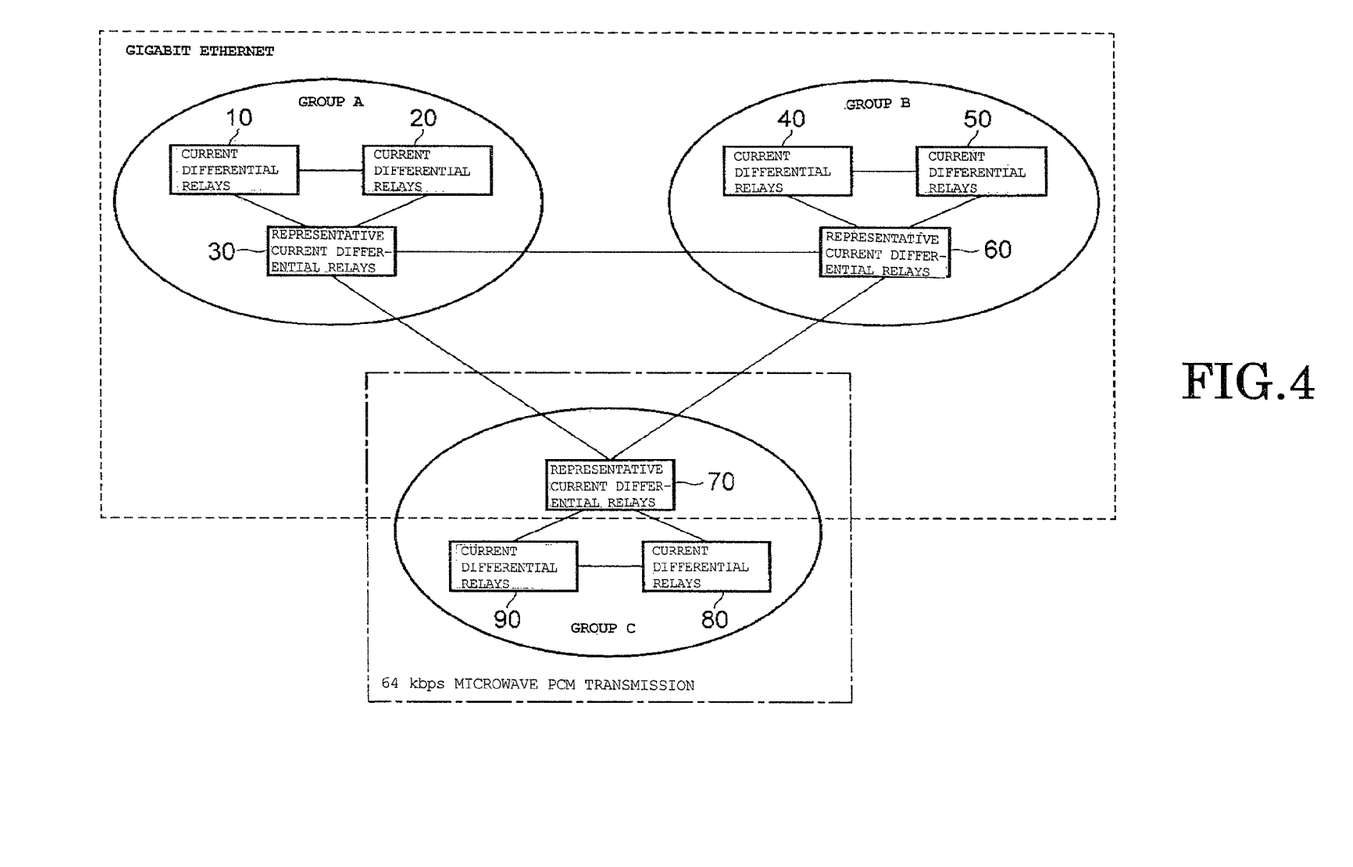
FIG. 4 is a view showing an example of a communication network between groups shown in FIG. 3.

In this embodiment, the case is described, by way of example, in which the current differential relays 10 to 90 are connected by means of an asynchronous communication network such as a gigabit Ethernet. However, there is no restriction to this. For example, as shown in FIG. 4, an arrangement could be employed in which the communication systems between the current differential relays 10 to 90 are not the same. For example, an arrangement could be employed in which the current differential relays 10 to 70 constituting the groups A and B are connected by a gigabit Ethernet and the current differential relays 70 to 90 constituting the group C are connected by an existing communication system, such as for example a 64 kbps microwave PCM (Pulse Code Modulation) synchronous communication network. If the representative current differential relay 70 has a gigabit Ethernet port, the current differential relays 10 to 90 can acquire the current data of all the other current differential relays.

Also, although the above embodiment was described for an example in which there are nine current differential relays, there is no restriction to the number of current differential relays being nine.

Figure 5:
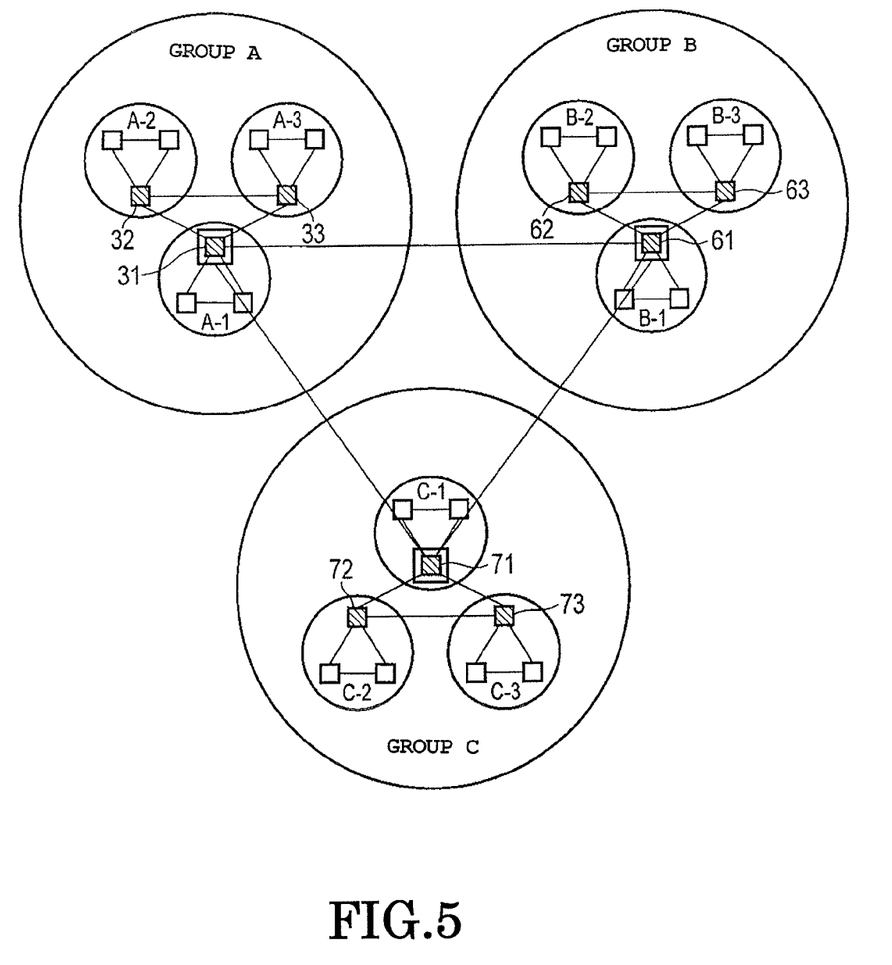
FIG. 5 is a view showing an example of the layout of a three-layer current differential relay system.

Also, in the above embodiment, an example was described in which the current differential relays were connected in a two-layer arrangement comprising representative current differential relays and other current differential relays. However, there is no restriction to this. For example, FIG. 5 is a view showing an example of a case in which a three-layer current differential relay system is constituted comprising 27 current differential relays. In FIG. 5, the 27 current differential relays are divided into nine groups of three current differential relays in each case, namely: A-1, A-2, A-3; B-1, B-2, B-3; and C-1, C-2, C-3. The representative current differential relays 31, 32, 33, 61, 62, 63 and 71, 72, 73 are respectively set up in each group. In the nine groups, a single super-group A is formed by the groups A-1, A-2, and A-3; a super-group B is formed by the groups B-1, B-2 and B-3; and a super-group C is formed by the groups C-1, C-2 and C-3. In the super-groups A, B and C, super representative current differential relays 31, 61 and 71 are respectively set up. Each super representative current differential relay performs communication in the same way as in FIG. 3 by communication of the representative current differential relays of the same super-group and the super representative current differential relays of the other groups. In this way, a current differential relay system constituted by three layers can be implemented of the type in which all of the terminals are evaluated.

Figure 6:
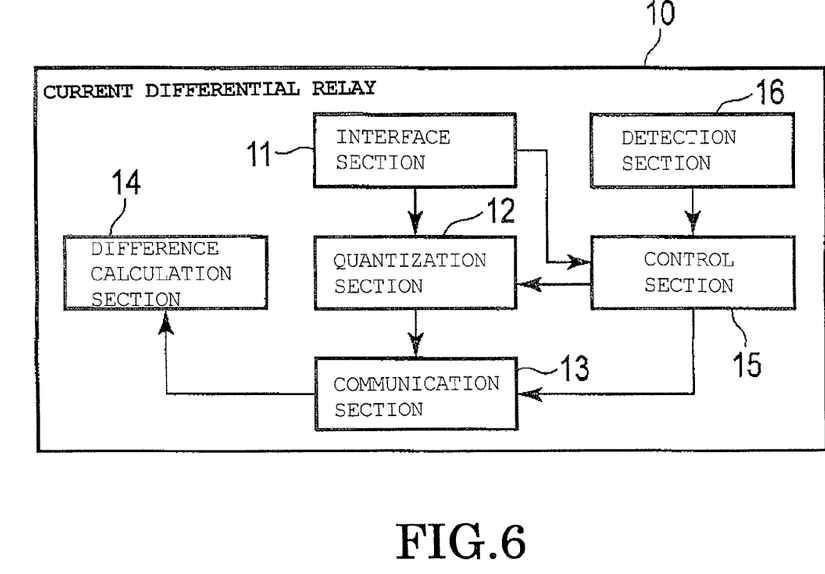
FIG. 6 is a block diagram showing another example of the functional layout of the current differential relay shown in FIG. 1.

Also, as shown in FIG. 6, the current differential relays 10 to 90 according to this embodiment may further comprise a detection section 16 that detects the communication load of the host device thereof. In this case, the control sections 15 in the current differential relays 10 to 90 may be provided with a first changeover function of changing over representation to another current differential relay if the communication load abruptly increases i.e. if the degree of increase of the communication load exceeds a preset threshold degree of increase. The memories of the control sections 15 further register the order in which representation may be changed over, in regard to representation of the current differential relays in the group.

Figure 7A:
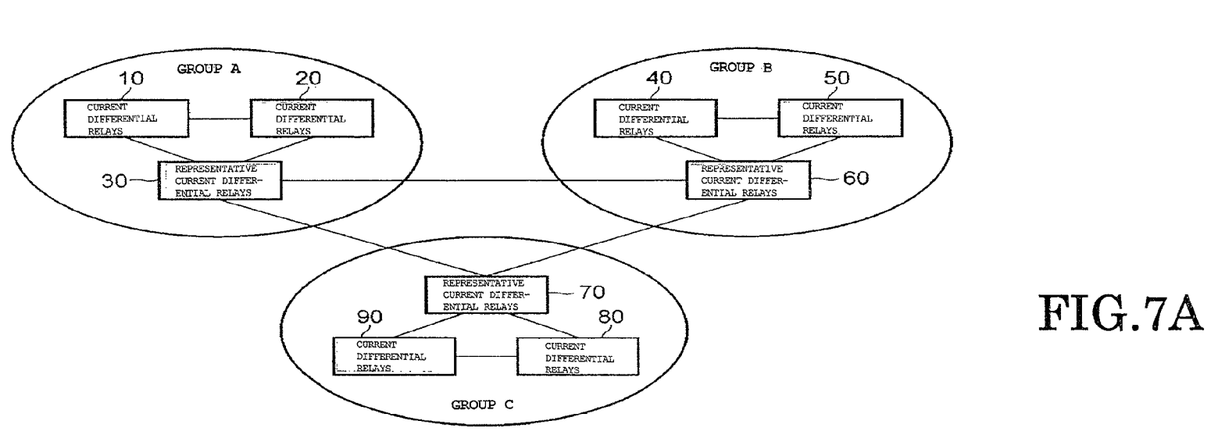
FIG. 7A and FIG. 7B are views showing an example in which the layer construction shown in FIG. 3 is interchanged.
Figure 7B:
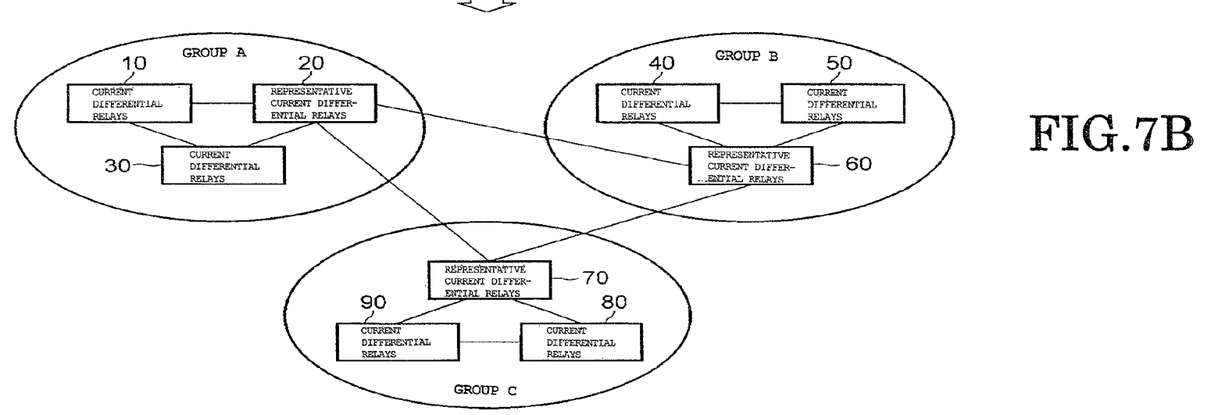

A specific example will now be described with reference to FIG. 7A and FIG. 7B. In the memories of the representative current differential relays in FIG. 7A and FIG. 7B, an order of preference is set beforehand whereby the current differential relay 20 is given representative status in preference to the current differential relay 10. When there is an abrupt increase in the communication load of the representative current differential relay 30, the detection section 16 of the representative current differential relay 30 detects this abrupt increase in communication load and reports this increase to its control section 15. When the control section 15 of the representative current differential relay 30 receives this report from the detection section 16, by a first changeover function, it reports, to the current differential relays 10 and 20, its intention to change over representation to the current differential relay 20. Also, the control section 15 of the current differential relay 30, by this first changeover function, cancels the registration of its host device as a representative relay, and sets the current differential relay 20 as the new representative current differential relay.

When the control section 15 in the new representative current differential relay 20 receives this report from the current differential relay 30, by this first changeover function, it registers its own host in memory as being a representative relay, and registers the representative current differential relays 60, 70 of the other groups. In this way, as shown in FIG. 7B, for example when the communication load of the representative current differential relay 30 has abruptly increased, the representative current differential relay is automatically changed over to the current differential relay 20.

Also, the control sections 15 in the current differential relays 10 to 90 according to the present embodiment may be provided with a second changeover function whereby the group layout is changed over in accordance with the magnitude of the communication load.

Figure 8A:
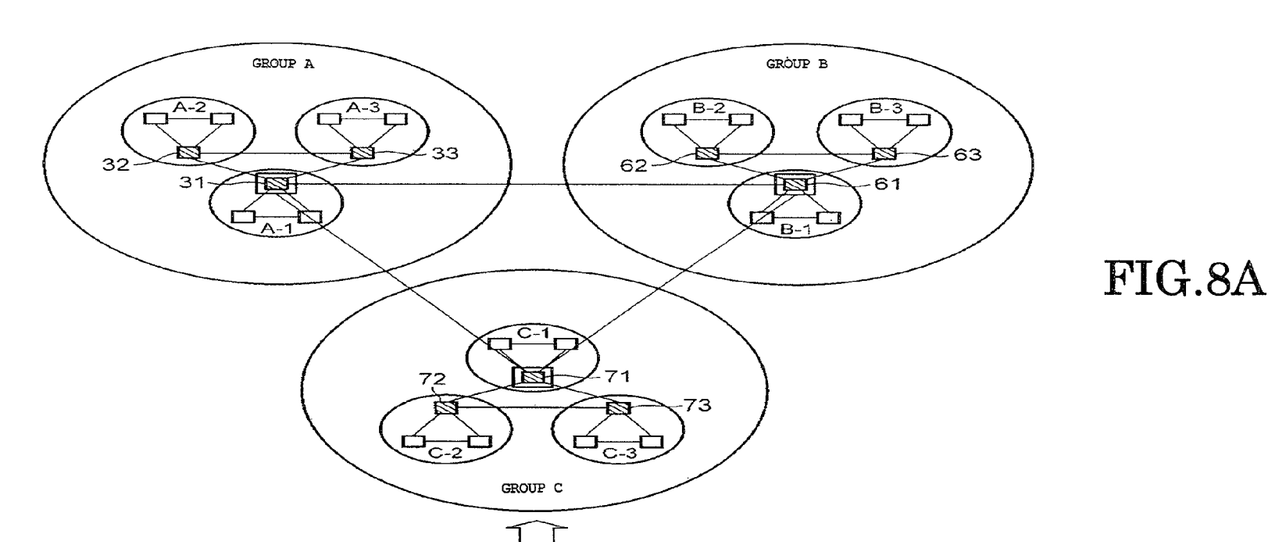
FIG. 8A and FIG. 8B are views showing an example in which the layer construction shown in FIG. 5 is interchanged.

A specific example is described with reference to FIG. 8A and FIG. 8B. In FIG. 8A, when the detection sections 16 of the super representative current differential relays 31, 61, 71 detect that the communication load is no more than a preset threshold value, they report this fact to the control sections 15 of their host relays. When the control section 15 of the super representative current differential relay 31 receives this report from its detection section 16, by the second changeover function, it gives instructions to the representative current differential relays 32, 33 of the groups A-2, A-3 to change over the groups A-1 to A-3 to a group A', in which nine current differential relays perform multicast transmission. Also, when the control section 15 of the super representative current differential relay 61 receives this report from the detection section 16 thereof, by the second changeover function, it issues instructions to the representative current differential relays 62, 63 of the groups B-2, B-3 to change over the groups B-1 to B-3 to a group B', in which nine current differential relays perform multicast transmission. Also, when the control section 15 of the super representative current differential relay 71 receives this report from the detection section 16 thereof, by the second changeover function, it issues instructions to the representative current differential relays 72, 73 of the groups C-2, C-3 to change over the groups C-1 to C-3 to a group C', in which nine current differential relays perform multicast transmission.

Figure 8B:
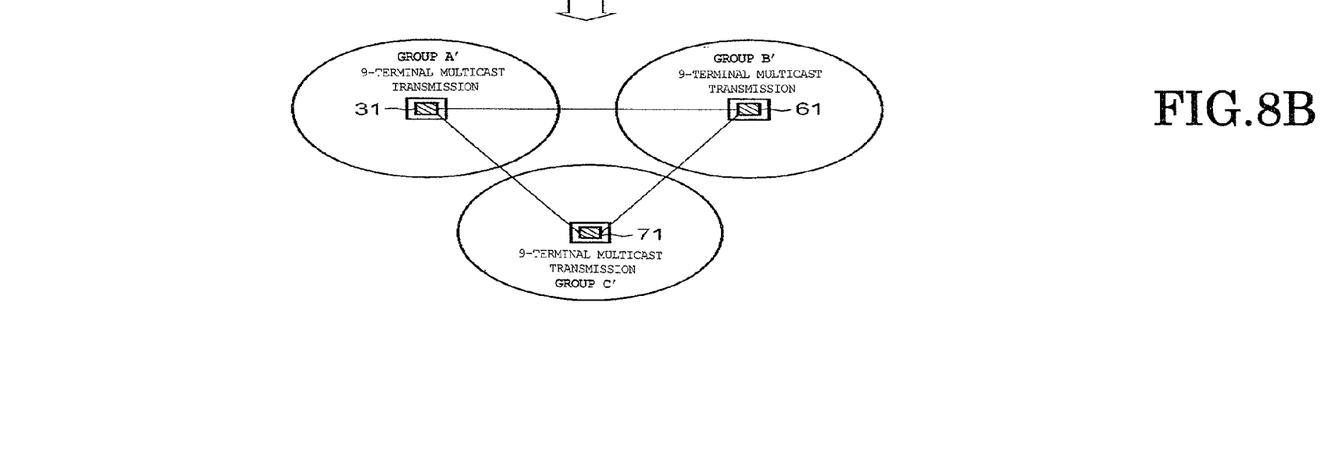

Also in FIG. 8B, when the detection section 16 of the super representative current differential relays 31, 61, 71 detects that the preset threshold value of the communication load has been exceeded, it reports this fact to the control section 15 of each relay. When the control section 15 of the super representative current differential relay 31 receives this report from the detection section 16, by the second changeover function, it issues instructions to the current differential relays 32, 33 to change over the group A' to the groups A-1 to A-3, in which the current differential relays 31, 32, 33 are respectively designated as the representative current differential relays.

Also, when the control section 15 of the super representative current differential relay 61 receives this report from the detection section 16, by the second changeover function, it issues instructions to the current differential relays 62, 63 to change over the group B' to the groups B-1 to B-3, in which the current differential relays 61, 62, 63 are respectively designated as the representative current differential relays. Also, when the control section 15 of the super representative current differential relay 71 receives this report from the detection section 16, by the second changeover function, it issues instructions to the current differential relays 72, 73 to change over the group C' to the groups C-1 to C-3, in which the current differential relays 71, 72, 73 are respectively designated as the representative current differential relays.

Thus, when the communication load is high, a layered construction is adopted in order to mitigate the network load, but, when the load is low, groups A' to C' are constituted, in which multicast transmission is performed between nine current differential relays. Also, each of the current differential relays is arranged to acquire the current data of all the other current differential relays by performing transmission/reception of current data between groups, between the super representative current differential relays 31, 61, 71 of the groups A' to C'.

Also, while, in the above embodiment, the case has been described where a single-layer group is formed by three current differential relays, there is no restriction to this example. The number of layers and number of relays forming a single-layer group is set in each current differential relay system, taking into account the two factors: communication traffic load and time required for the current data to be provided by all of the relays, so as to optimize these factors.

While various embodiments of the present invention have been described by way of example, the scope of the present invention is not intended to be restricted to these embodiments. These embodiments could be implemented in various other modified forms without departing from the gist of the invention and various deletions, substitutions or alterations could be made. Such embodiments or modifications thereof are included in the scope or gist of the invention and are likewise included in the invention set out in the patent claims and equivalents thereof.

What is claimed is:

1. A current differential relay employed in a current differential relay system that protects transmission lines linking installations by a plurality of current differential relays, said current differential relay comprising:
   an interface section that receives current supplied from said transmission line;
   a quantization section that quantizes a received current and converts said received current to first current data;
   a communication section that, in a case where a relay is a representative current differential relay of a first group formed of some current differential relays in said plurality of current differential relays, receives second current data from another current differential relay belonging to said first group, transmits said second current data and said first current data jointly to a representative current differential relay belonging to said second group, receives third current data from said representative current differential relay, and transmits said third current data to said other current differential relay; and
a difference calculation section that executes a current difference calculation based on said first to third current data.

2. A current differential relay employed in a current differential relay system that protects transmission lines linking installations by a plurality of current differential relays, said current differential relay comprising:
an interface section that receives current supplied from said transmission line;
a quantization section that quantizes a received current and converts said received current to first current data;
a communication section that, in a case where a relay is a representative current differential relay of a first group formed of some current differential relays in said plurality of current differential relays, receives second current data from another current differential relay belonging to said first group, transmits said second current data and said first current data jointly to a representative current differential relay belonging to said second group, receives third current data from said representative current differential relay, and transmits said third current data to said other current differential relay;
a difference calculation section that executes a current difference calculation based on said first to third current data; and
a control section that controls said interface section, said quantization section, said communication section and said difference calculation section.

3. The current differential relay according to claim 1, wherein, if a relay is not a representative current differential relay of said first group, said communication section thereof transmits said first current data to other current differential relays belonging to said first group and to a representative current differential relay, and receives second current data from said other current differential relays and third current data from a representative current differential relay belonging to said second group.

4. The current differential relay according to claim 3, wherein said quantization section converts said received current to said first current data in accordance with a synchronization signal that is shared between said plurality of current differential relays.

5. The current differential relay according to claim 3, further comprising:
a detection section that detects a communication load; and
a control section that changes over a representative current differential relay thereof to another current differential relay belonging to said first group, if a degree of increase of said communication load detected by said detection section exceeds a preset threshold degree of increase.

6. The current differential relay according to claim 3, wherein, if a relay is a super representative current differential relay of a first upper-layer group whereof said first group is formed as one element, said communication section receives third current data from other representative current differential relays belonging to said first upper-layer group, transmits said third current data and said first and second current data of said first group jointly to a super representative current differential relay belonging to a second upper-layer group, receives fourth current data from said super representative current differential relay, and transmits said fourth current data to said other representative current differential relays.

7. The current differential relay according to claim 6, further comprising:
a detection section that detects a communication load; and
a control section that changes data transmission between said other current differential relays belonging to said first upper-layer group over to multicast transmission if said communication load detected by said detection section is less than a preset threshold value.

8. A current differential relay system that protects transmission lines linking installations by a plurality of current differential relays,
wherein a current differential relay comprises:
an interface section that receives current supplied from said transmission line;
a quantization section that quantizes said received current and converts said received current to first current data;
a communication section that, in a case where a relay is a representative current differential relay of a first group formed of some current differential relays in said plurality of current differential relays, receives second current data from another current differential relay belonging to said first group, transmits said second current data and said first current data jointly to a representative current differential relay belonging to a second group, receives third current data from said representative current differential relay, and transmits said third current data to said other current differential relay; and
a difference calculation section that executes a current difference calculation based on said first to third current data.

9. The current differential relay system according to claim 8,
wherein, if a relay is not a representative current differential relay of said first group, said communication section transmits said first current data to other current differential relays belonging to said first group and to a representative current differential relay, and receives second current data from said other current differential relay and third current data from a representative current differential relay.

10. The current differential relay system according to claim 9,
wherein a current differential relay and a representative current differential relay belonging to said first group and a representative current differential relay belonging to said second group are connected by an asynchronous communication network, and a representative current differential relay belonging to said second group and a current differential relay belonging to said second group are connected by a synchronous communication network.

* * * * *